(12) United States Patent
Shono

(10) Patent No.: US 6,516,156 B2
(45) Date of Patent: Feb. 4, 2003

(54) CAMERA HAVING LIQUID CRYSTAL DISPLAY

(75) Inventor: Tetsuji Shono, Saitama (JP)

(73) Assignee: Pentax Corporation, Tokyo (JP)

(*) Notice: Subject to any disclaimer, the term of this patent is extended or adjusted under 35 U.S.C. 154(b) by 0 days.

(21) Appl. No.: 09/802,972

(22) Filed: Mar. 12, 2001

(65) Prior Publication Data

US 2001/0022895 A1 Sep. 20, 2001

(30) Foreign Application Priority Data

Mar. 15, 2000 (JP) .................................. 2000-072793

(51) Int. Cl.[7] .................... G03B 13/02; G03B 13/08; H04N 5/222; H04N 5/225
(52) U.S. Cl. .................. 396/374; 396/384; 396/386; 348/333.01; 348/333.09; 348/341
(58) Field of Search ................... 396/373, 374, 396/384, 385, 386, 84, 148, 152, 378, 150; 348/333.01, 333.06, 333.07, 333.09, 333.08, 341

(56) References Cited

U.S. PATENT DOCUMENTS

| 4,279,489 A | 7/1981 | Shono et al. ............... 396/384 |
| 5,155,516 A | 10/1992 | Shindo ....................... 396/373 |
| 5,701,534 A | 12/1997 | Taguchi et al. ............ 396/373 |
| 5,907,726 A | 5/1999 | Abe et al. ................... 396/141 |
| 5,966,553 A | * 10/1999 | Nishitani et al. .......... 396/303 |

* cited by examiner

Primary Examiner—David M. Gray
Assistant Examiner—Rochelle Blackman
(74) Attorney, Agent, or Firm—Greenblum Bernstein, P.L.C.

(57) ABSTRACT

A camera including a liquid crystal display in which an image formed by a photographing lens system of the camera is indicated; an ocular viewing optical system which includes a half-mirror surface and an eyepiece lens system, the half-mirror surface reflecting the image of the liquid crystal display toward the eyepiece lens system, so that the reflected image can be viewed through the eyepiece lens system; and a direct viewing optical system for viewing the image of the liquid crystal display through the half-mirror surface.

7 Claims, 5 Drawing Sheets

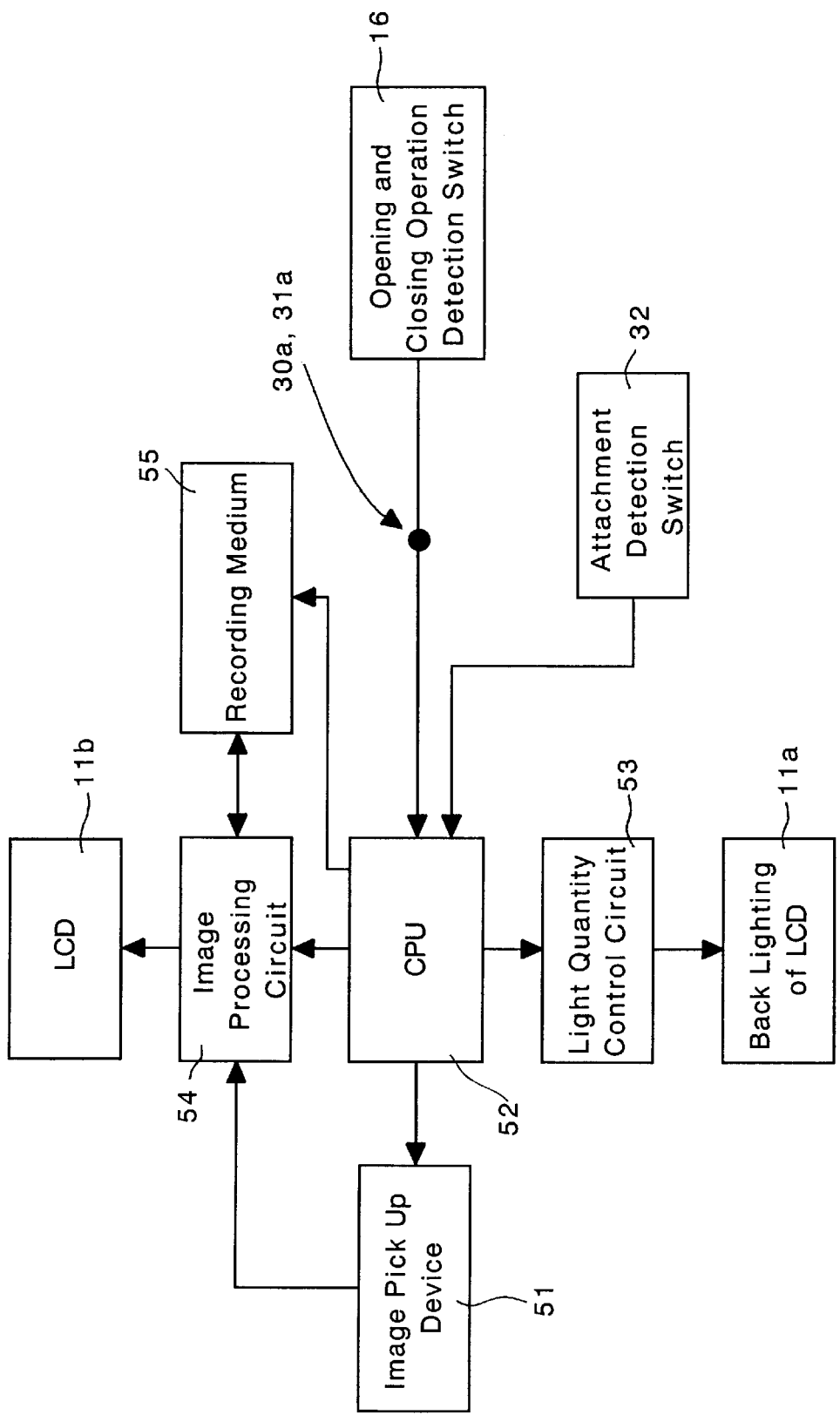

CAMERA HAVING LIQUID CRYSTAL DISPLAY

BACKGROUND OF THE INVENTION

1. Field of the Invention

The present invention relates to a camera having a liquid crystal display.

2. Description of the Related Art

In a known digital still camera, in general, a liquid crystal display (LCD) is provided to confirm an object image taken by the camera or during photographing of an object. The LCD has an advantage that more than one person can view the object or the photographed object image at one time, but has the disadvantage of the object image not being able to be viewed clearly in bright surroundings, since the quantity of light of the back light is limited. There is also the disadvantage of an increased power consumption of the camera. Moreover, in a known digital camera in which an optical finder is provided in addition to the LCD to locate an optical image of a photographing lens system to be viewed, however, if an optical finder is provided, the overall manufacturing cost is increased.

SUMMARY OF THE INVENTION

It is an object of the present invention to provide a camera having a liquid crystal display in which two modes, i.e., a mode in which the LCD is directly viewed and a mode in which the LCD is viewed through an eyepiece lens system can be selected without providing an optical finder through which an optical image formed by a photographing lens system is viewed.

To achieve the object mentioned above, a camera is provided, including a liquid crystal display in which an image formed by a photographing lens system of the camera is indicated; an ocular viewing optical system which includes a half-mirror surface and an eyepiece lens system, the half-mirror surface reflecting the image of the liquid crystal display toward the eyepiece lens system, so that the reflected image can be viewed through the eyepiece lens system; and a direct viewing optical system for viewing the image of the liquid crystal display through the half-mirror surface.

If the direct viewing optical system and the ocular viewing optical system are provided in a finder unit which is detachably attached to the camera, it is possible to provide two view systems without increasing the size of the camera.

Preferably, the direct viewing optical system includes a first prism which is provided with a first surface parallel with the liquid crystal display, a second surface opposed to the first surface at an angle inclined with respect to the first surface, a third surface intersecting the first and second surfaces, and a fourth surface opposed to the third surface; and a second prism which is provided with a first surface parallel with the second surface of the first prism, and a second surface parallel with the first surface of the first prism. The second surface of the first prism and the first surface of the second prism opposed thereto are provided with a common half-mirror surface.

Preferably, the angles of the surfaces of the first prism are set so that light emitted from the liquid crystal display and incident upon the first surface of the first prism is reflected by the second surface thereof, defined by the half-mirror surface, toward the first surface, is internally reflected by the first surface toward the third surface, is reflected by the third surface toward the fourth surface, and is transmitted through and emitted from the fourth surface.

In an embodiment, a third prism is provided which makes the light emitted from the fourth surface of the first prism incident upon the eyepiece lens system.

If an opening and closing device is provided for opening and closing a direct view window of the direct viewing optical system, no harmful light entering the ocular optical system through the direct optical view system.

If a detection device is provided for detecting the operation of the direct view window opening and closing device; and a control device responsive to the detection device for controlling the illuminance of back light of the liquid crystal display, not only can the liquid crystal display be more clearly viewed but also the electric power consumption can be reduced.

If a detection device for detecting the operation of the opening and closing device for the direct view window and a control device responsive to the detection device for controlling the illuminance of back lighting of the liquid crystal display are provided.

The present disclosure relates to subject matter contained in Japanese Patent Application No.2000-72793 (filed on Mar. 15, 2000) which is expressly incorporated herein by reference in its entirety.

BRIEF DESCRIPTION OF THE DRAWING

The invention will be discussed below in detail with reference to the accompanying drawings, in which:

FIG. 5 is a block diagram of a control system for controlling the quantity of light of the back light, in accordance with the attachment and detachment operation of a finder unit and the opening and closing operation of a view window opening and closing device.

DESCRIPTION OF THE PREFERRED EMBODIMENTS

Figure 1:
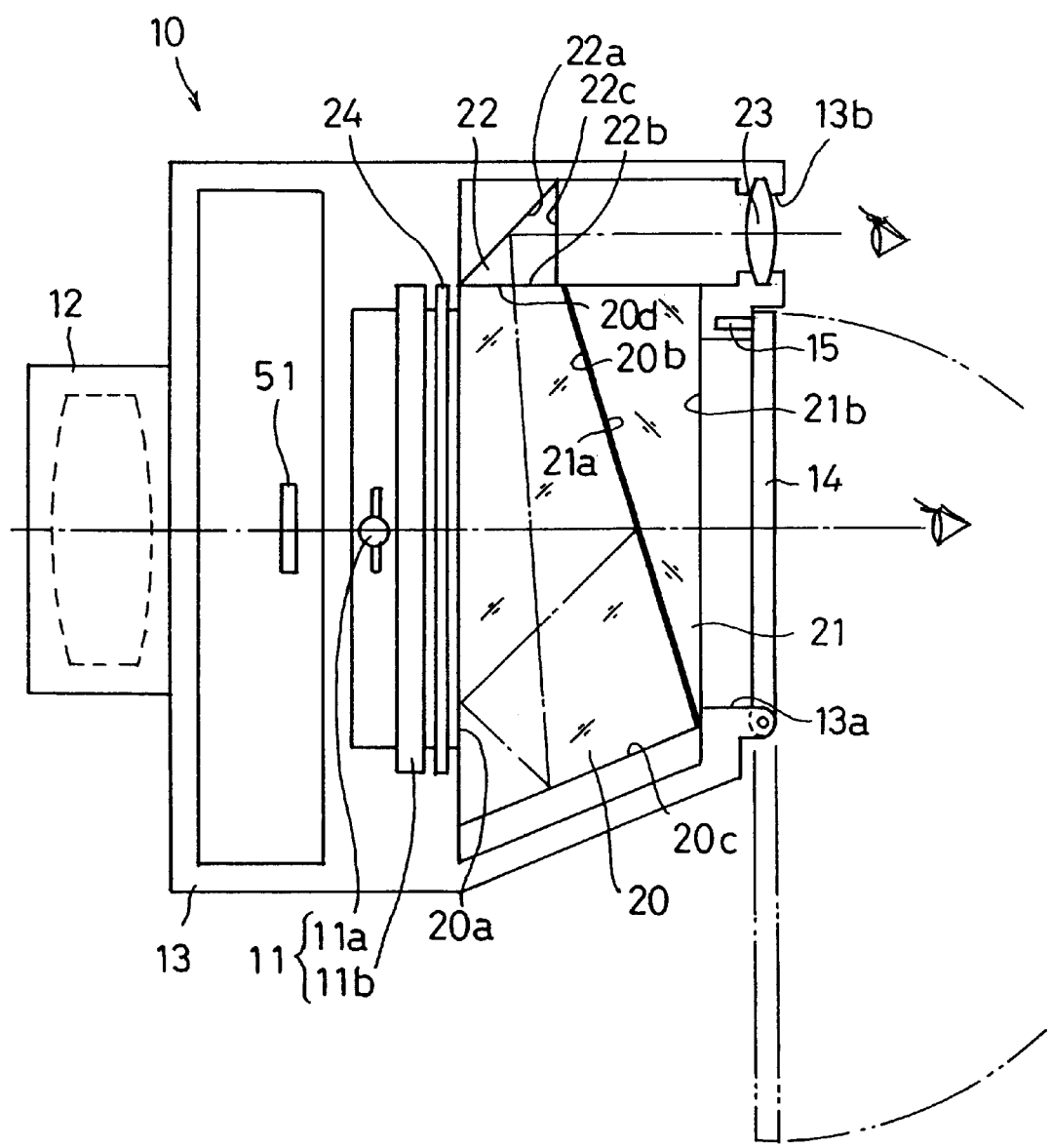
FIG. 1 is a sectional view of a first embodiment of a camera having a liquid crystal display according to the present invention.
Figure 2:
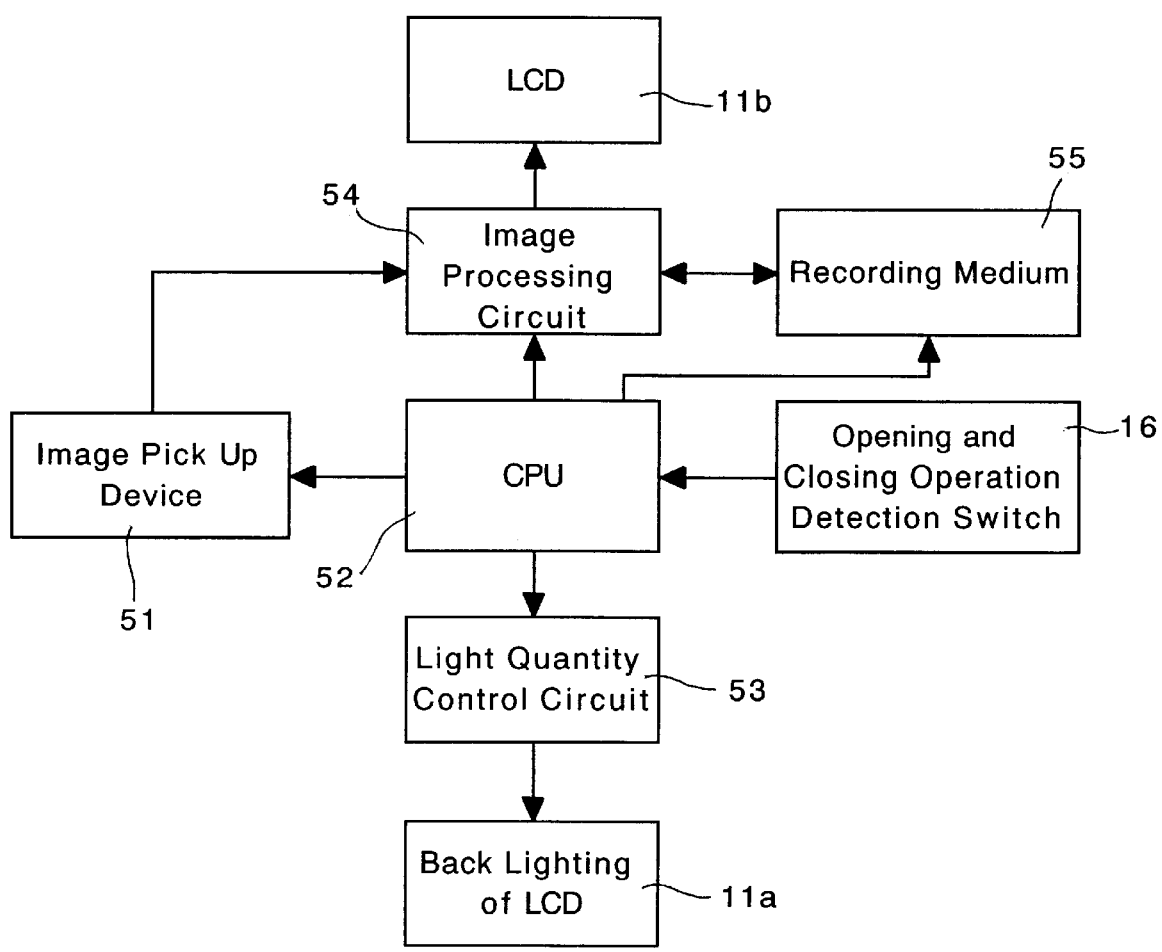
FIG. 2 is a block diagram of a control system for controlling the quantity of light of the back light, in accordance with the opening and closing operation of a view window opening and closing device.
Figure 3:
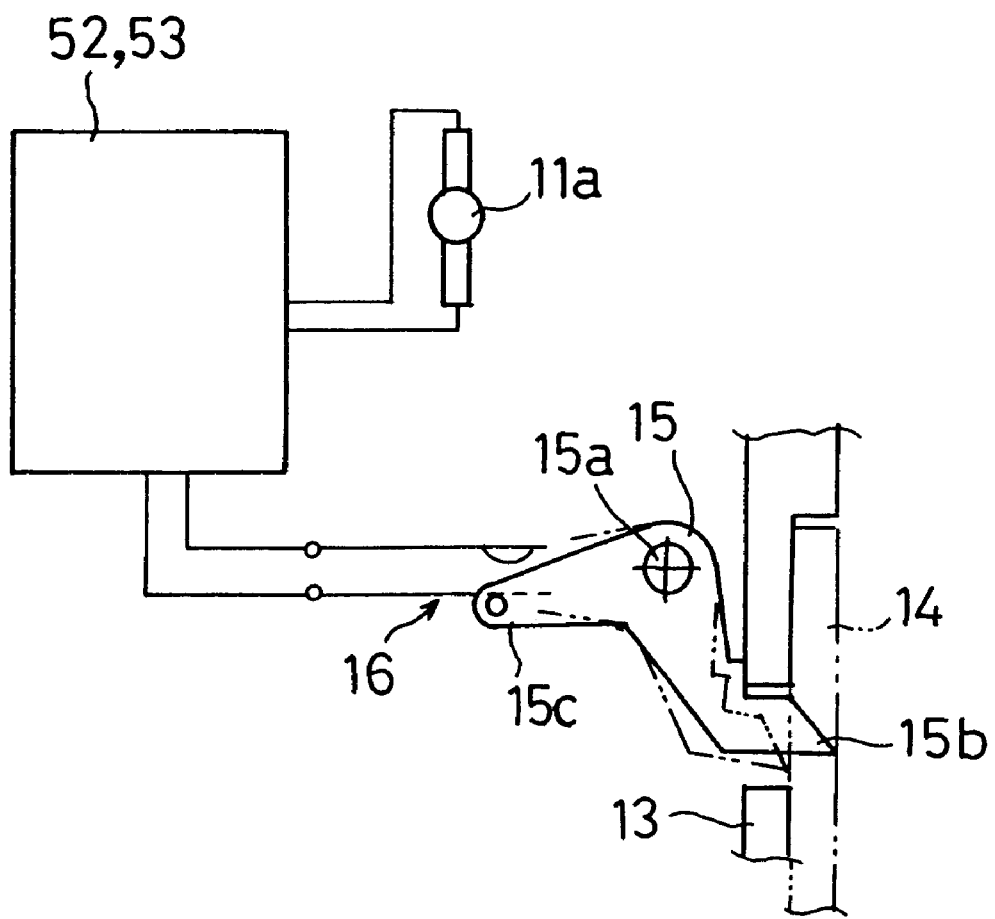
FIG. 3 is a schematic view of a detection device for detecting the operation of the view window opening and closing device.

FIGS. 1 through 3 show a first embodiment of the present invention. A digital camera 10 shown in FIG. 1 is provided, on a front surface of a camera body 13, with a photographing lens 12, so that an object image formed by the photographing lens 12 can be picked-up by an image pickup device 51. The picked-up image is stored in a recording medium 55 via a CPU 52 and an image processing circuit 54, or is displayed in a rearwardly facing LCD (liquid crystal display) panel 11b provided on the camera body 13. The LCD panel 11b is illuminated from behind (left side in FIG. 1) by the back light 11a, so that the transmitted light carrying the photographed image is indicated in the LCD 11, and can be viewed by the user.

A Fresnel lens 24, a first prism (trapezoidal prism) 20, a second prism (triangular prism) 21, a third prism (rectangular prism) 22, and an eyepiece lens system (magnifier) 23 are provided behind the LCD 11 (on the right side as shown in FIG. 1). These optical components are all arranged in the camera body 13 which is constructed from a light intercepting material. The camera body 13 is provided with a view window 13a behind the second prism 21, so that the LCD 11 can be viewed through the view window 13a. An ocular view window 13b is provided behind the eyepiece lens system 23.

The first prism 20 and the second prism 21 constitute a direct viewing optical system through which the LCD 11 can be directly viewed. The first prism 20 is provided with a first surface 20a which is opposed to the Fresnel lens 24 (LCD panel 11b) lying parallel therewith. The first prism 20 is also provided with a second surface 20b opposed to the first surface 20a at a predetermined inclination angle, a third surface 20c intersecting the first and second surfaces 20a and 20b, and a fourth surface 20d which is opposed to the third surface 20c at a predetermined inclination angle and which intersects the first surface 20a and the second surface 20b. The second surface 20b is provided with a half-coat to which the first surface 21a of the second prism 21 is adhered. Namely, the second surface 20b (first surface 21a) forms a half-mirror surface. The second prism 21 cemented to the first prism is provided with a second surface 21b parallel with the first surface 20a of the first prism 20. The second surface 21b faces the direct view window 13a. Namely, light emitted from the LCD 11 and condensed by the Fresnel lens 24 is made incident upon the first surface 20a at right angles; reaches the second surface 20b (first surface 21a/half-mirror surface); is partly transmitted therethrough; and is emitted from the second surface 21b, so that the light emitted from the LCD 11 can be directly viewed through the direct view window 13a. It is preferable that the first prism 20 and the second prism 21 be made of identical optical elements. The first surface 20a of the first prism 20 and the second surface 21b of the second prism 21 are parallel, so that no chromatic aberration due to a prism effect occurs.

The half-mirror surface 20b, the first prism 20, the third prism 22 and the eyepiece lens system 23, of the direct viewing optical system constructed as described above, constitute an ocular viewing optical system through which the image of the LCD 11 can be ocularly viewed. The first prism 20 is, as mentioned above, provided with the second surface 20b opposed to the first surface 20a at a predetermined inclination angle, the third surface 20c intersecting the first and second surfaces 20a and 20b, and the fourth surface 20d which is opposed to the third surface 20c at a predetermined inclination angle and which intersects the first surface 20a and the second surface 20b. The second surface 20b forms a half-mirror surface provided with a half-coat, and the third surface 20c is provided with aluminum film vapor-deposited thereon. The third prism 22 is provided on the fourth surface 20d of the first prism 20. The third prism 22 is provided with an incidence surface 22b which is parallel with the fourth surface 20d of the first prism 20, an emission surface 22c normal to the incidence surface 22b, and a reflection surface 22a which lies at a 45 degree angle with respect to the incidence surface 22b and the emission surface 22c. The optical axis of the eyepiece lens system 23 is perpendicular to the emission surface 22c. Consequently, light emitted from the LCD 11 is made incident upon the first surface 20a of the first prism 20 at right angles; reaches the second surface 20b (first surface 21a); and is partly reflected thereby toward the first surface 20a. The light is thereafter internally (totally) reflected by the first surface 20a toward the third surface 20c; is internally reflected by the third surface toward the fourth surface 20d; and is emitted from the fourth surface 20d. The light emitted from the fourth surface 20d is made incident upon the third prism 22 through the incidence surface 22b; is reflected by the reflection surface 22a; is emitted from the emission surface 22c; and is magnified by the eyepiece lens system 23, so that the light can be ocularly viewed through the eyepiece window 13b.

The camera body 13 is provided with an opening and closing cover (opening and closing device) 14 pivotally connected thereto, below the direct view window 13a. The cover 14 is in the form of a plate made of a light intercepting material. The direct view window 13a can be opened or closed in accordance with the rotation of the cover 14. Upon ocular viewing, the cover 14 is closed and the image is viewed through the ocular view window 13b, so that no harmful light enters the ocular viewing optical system through the direct view window 13a. Upon direct viewing, the cover 14 is opened, so that the image can be directly viewed through the direct view window 13a.

The camera body 13 is also provided with an opening and closing operation detection member (detection device) 15 which detects the opening and closing operation of the cover 14. As can be seen in FIG. 3, the opening and closing operation detection member 15 is rotatable about a pivot shaft 15a and is continuously biased in the counterclockwise direction by a biasing device such as a spring (not shown), so that a projection 15b of the detection member projects from the camera body 13. When the cover 14 is closed, the projection 15b is depressed, so that the detection member 15 is rotated clockwise in accordance with the movement of the projection 15b. Consequently, the pressing portion 15c of the detection member 15 is rotated to turn the detection switch 16 ON. Conversely, if the cover 14 is opened, the detection switch 16 is turned OFF. When the detection switch 16 is ON, the CPU 52 operates the light quantity control circuit 53 to appropriately control the quantity of light of the back light 11a of the LCD 11 (FIG. 2). Namely, when the cover 14 is closed and the image is ocularly viewed through the eyepiece window 13b, the quantity of light of the back light 11a is reduced since no external light is incident on the LCD 11. When the cover 14 is opened so that the image is directly viewed through the direct view window 13a, the quantity of light of the back light is increased, since the external light is incident on the LCD 11. Consequently, the LCD 11 can be clearly viewed. Furthermore, since the quantity of light of the back light is increased only when it is needed, the electric power consumption can be reduced.

In the camera 10 constructed as described above, if the LCD 11 is viewed by more than one person, the cover 14 is opened, so that the LCD 11 can be viewed through the direct view window 13a. In this state, the back light 11a of the LCD 11 is set at a normal quantity of light via the detection member 15 and the light quantity control circuit 53. Moreover, owing to the Fresnel lens 24, the peripheral portion of the display screen is bright and can be clearly viewed. If the cover 14 is closed to view the LCD 11 through the ocular view window 13b, the backlight 11a of the LCD 11 which set to a low brightness via the detection member 15 and the light quantity control circuit 53 can be clearly viewed through the eyepiece lens system 23.

Figure 4:
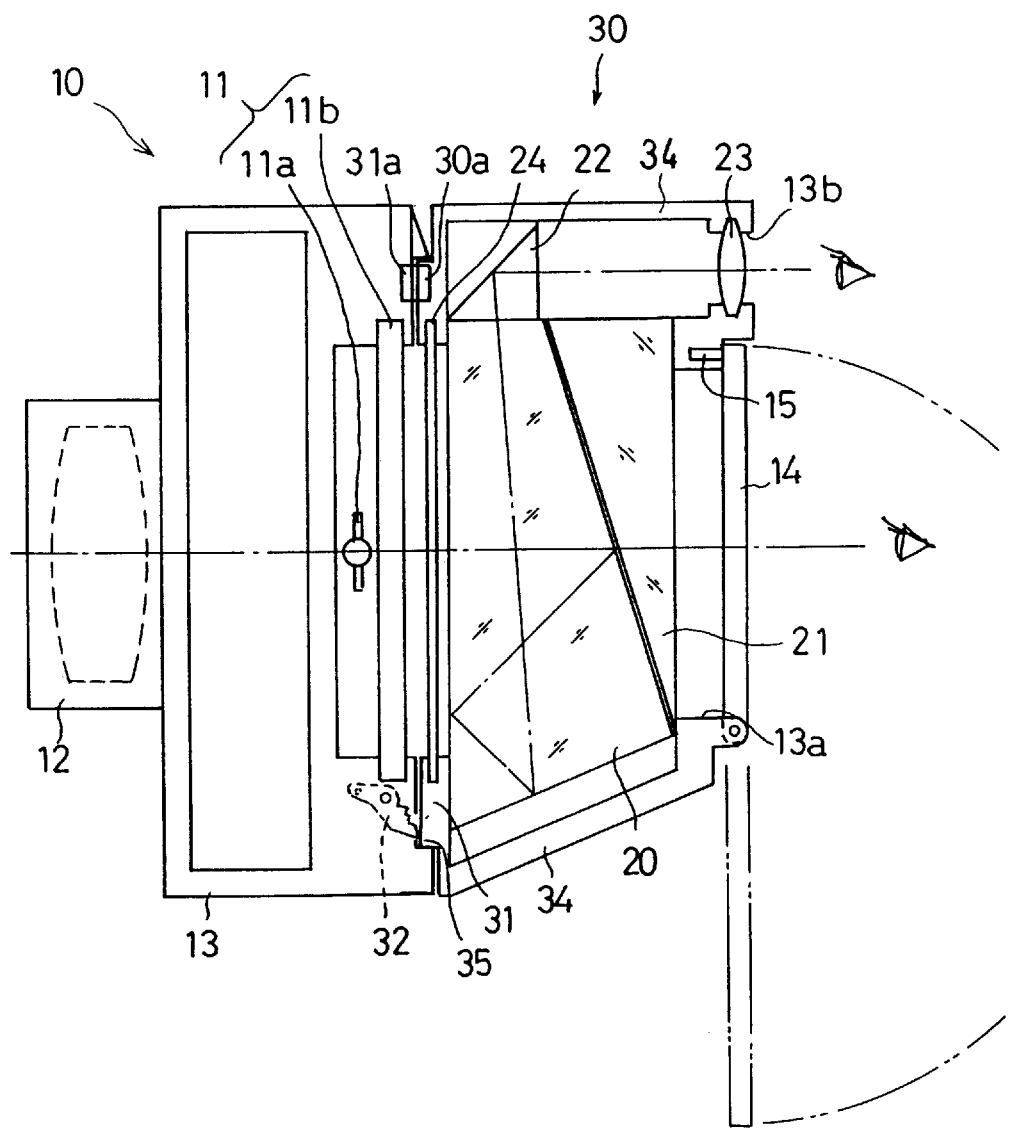
FIG. 4 is a sectional view of a second embodiment of a camera having a liquid crystal display, according to the present invention.

FIGS. 4 and 5 show a second embodiment of the present invention. A mounting shoe 31 is provided around the LCD 11 of the camera 10 shown in FIG. 4. The finder unit 30 which is detachably attached to the mounting shoe 31 has a substantially square-tubular opaque cover body 34 which includes a Fresnel lens 24 whose size corresponds to the screen of the LCD 11 in the first embodiment, and a direct viewing optical system and an ocular viewing optical system, through which an image transmitted through the Fresnel lens 24 can be viewed. The cover body 34 is provided, on its outer surface, on which the Fresnel lens 24 is provided, with a foot portion 35 which is detachably attached to the mounting shoe 31. The cover body 34 is also provided on its surface on the opposite side from the Fresnel lens 24, with a direct view window 13a and an eyepiece window 13b, as in the first embodiment. Like the first embodiment, the cover 14 and the detection member 15 to detect the opening and closing operation of the cover 14 are also provided.

The attachment detection switch 32 is provided in the vicinity of the mounting shoe 31 of the camera 10 to detect the attachment of the finder unit 30. When the detection switch 32 detects the attachment of the finder unit 30, the CPU 52 is ready to operate the light quantity control circuit 53. The finder unit 30 and the mounting shoe 31 are respectively provided with contact terminals 30a and 31a. The contact terminal 30a is connected to the opening and closing operation detection switch 16 and the contact terminal 31a is connected to the CPU 52. Consequently, when the finder unit 30 is attached to the camera 10 (mounting shoe 31), the contact terminals 30a and 31a are connected, so that the opening and closing operation detection switch 16, and the CPU 52 are connected (FIG. 5). The structure of the attachment detection switch 32 can be similar to, for example, that of the opening and closing operation detection member 15 and the opening and closing operation detection switch 16 of the first embodiment, shown in FIG. 3.

Namely, when the finder unit 30 is attached to the camera 10 (mounting shoe 31), the attachment detection switch 32 is turned ON, so that the CPU 52 is ready to operate the light quantity control circuit 53. In this position, the same state as that in the first embodiment is established in which the quantity of light of the back light of the LCD 11 can be controlled in accordance with the opening and closing operation of the cover 14.

In the camera 10 constructed as above, since the finder unit 30 is detachably attached to the mounting shoe 31 of the camera 10 (FIG. 4), if the finder unit 30 is unnecessary, it can be detached from the camera 10.

Although the camera 10 is a digital still camera in the illustrated embodiments, the present invention can be applied to any camera having a LCD 11, such as an eight-millimeter video camera. Moreover, although the direct viewing optical system and the ocular viewing optical system are aligned in the vertical direction of the camera 10 in the illustrated embodiments, it is possible to arrange both the optical view systems in the lateral direction, depending on the arrangement of the operation portion of the camera. Furthermore, the reflection surface 22a can be a reflection mirror, in stead of the third prism 22. If the eyepiece lens system 22 is a magnifier, the photographic image can be viewed in more detail.

As can be understood from the above discussion, according to the present invention, a camera having a liquid crystal display can be provided wherein there are two selectable modes, i.e., a first mode (direct viewing optical system) in which the LCD can be directly viewed, and a second mode (ocular viewing optical system) in which the LCD can be viewed through an eyepiece lens system. Furthermore, the opening and closing device (the cover 14) for opening and closing the direct view window 13a of the direct viewing optical system prevents harmful light entering the ocular viewing optical system through the direct viewing optical system at the second mode. Moreover, the control device for controlling the quantity of light of the back light of the LCD 11 in accordance with the detection of the opening and closing operation of the opening and closing device controls an appropriate quantity of back light of the LCD 11, so that the LCD 11 can be clearly viewed and also reducing the electrical power consumption. In addition to the foregoing, if the direct viewing optical system and the ocular viewing optical system are provided in a finder unit which is detachably attached to the camera, the finder unit can be attached to the camera only when it is needed. Consequently, the size or shape of the camera is not increased.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A camera comprising:
    a liquid crystal display in which an image formed by a photographing lens system of the camera is indicated;
    an ocular viewing optical system which includes a half-mirror surface and an eyepiece lens system, said half-mirror surface reflecting the image of the liquid crystal display toward said eyepiece lens system, so that said reflected image can be viewed through the eyepiece lens system; and
    a direct viewing optical system for viewing the image of the liquid crystal display through said half-mirror surface.

2. The camera having a liquid crystal display, according to claim 1, wherein said direct viewing optical system and said ocular viewing optical system are provided in a finder unit which is detachably attached to the camera.

3. The camera having a liquid crystal display, according to claim 1, wherein said direct viewing optical system comprises:
    a first prism which is provided with a first surface parallel with the liquid crystal display, a second surface opposed to the first surface at an angle inclined with respect to said first surface, a third surface intersecting the first and second surfaces, and a fourth surface opposed to the third surface; and
    a second prism which is provided with a first surface parallel with the second surface of the first prism, and a second surface parallel with the first surface of the first prism;
    wherein the second surface of the first prism and the first surface of the second prism opposed thereto are provided with a common half-mirror surface.

4. The camera having a liquid crystal display, according to claim 3, wherein the angles of the surfaces of the first prism are set so that light emitted from the liquid crystal display and incident upon the first surface of the first prism is reflected by the second surface thereof, defined by the half-mirror surface, toward the first surface, is internally reflected by the first surface toward the third surface, is reflected by the third surface toward the fourth surface, and is transmitted through and emitted from the fourth surface.

5. The camera having a liquid crystal display, according to claim 4, further comprising a third prism which makes the light emitted from the fourth surface of the first prism incident upon the eyepiece lens system.

6. The camera having a liquid crystal display, according to claim 1, further comprising an opening and closing device for opening and closing a direct view window of the direct viewing optical system.

7. The camera having a liquid crystal display, according to claim 6, further comprising a detection device for detecting the operation of the opening and closing device for the direct view window; and a control device responsive to the detection device for controlling the illuminance of back light of the liquid crystal display.

* * * * *